United States Patent
Lamers (10) Patent No.: US 11,112,127 B2
(45) Date of Patent: Sep. 7, 2021

(54) GAS SEPARATOR

(71) Applicant: Spiro Enterprises B.V., Sint Anthonis (NL)

(72) Inventor: Antonius Gerardus Wilhelmus Maria Lamers, Asten (NL)

(73) Assignee: Spiro Enterprises B.V., Sint Anthonis (NL)

( * ) Notice: Subject to any disclaimer, the term of this patent is extended or adjusted under 35 U.S.C. 154(b) by 111 days.

(21) Appl. No.: 16/314,128

(22) PCT Filed: Jul. 3, 2017

(86) PCT No.: PCT/NL2017/050439
§ 371 (c)(1),
(2) Date: Dec. 28, 2018

(87) PCT Pub. No.: WO2018/004347
PCT Pub. Date: Jan. 4, 2018

(65) Prior Publication Data
US 2019/0154273 A1 May 23, 2019

(30) Foreign Application Priority Data
Jul. 1, 2016 (NL) .................................... 2017087

(51) Int. Cl.
*F24D 19/08* (2006.01)
*B01D 19/00* (2006.01)
*F16K 31/18* (2006.01)

(52) U.S. Cl.
CPC .......... *F24D 19/083* (2013.01); *B01D 19/00* (2013.01); *B01D 19/0036* (2013.01);
(Continued)

(58) Field of Classification Search
None
See application file for complete search history.

(56) References Cited

U.S. PATENT DOCUMENTS

| 3,854,906 A | 12/1974 | Roffelsen |
| 4,027,691 A | 6/1977 | Roffelsen |
| 4,381,928 A | 5/1983 | Roffelsen |

(Continued)

FOREIGN PATENT DOCUMENTS

| EP | 0226432 A2 | 12/1986 |
| EP | 126720 A2 | 12/2002 |

(Continued)

OTHER PUBLICATIONS

English language machine translation for WO 97/14922. Retrieved from https://translationportal.epo.org on Oct. 13, 2020. (Year: 2020).*

(Continued)

*Primary Examiner* — Jason M Greene
(74) *Attorney, Agent, or Firm* — Banner & Witcoff, Ltd.

(57) ABSTRACT

Separator device for separating gas from a liquid flow, including a housing having an inlet and an outlet. The separator device includes a venturi in a liquid flow path extending from the inlet to the outlet. The separator device includes a nozzle in communication with the liquid flow for spraying a part of the liquid of the liquid flow into the housing. The separator device includes a valve for allowing gas to escape from the housing.

23 Claims, 5 Drawing Sheets (52) U.S. Cl.
CPC ..... *B01D 19/0047* (2013.01); *B01D 19/0063* (2013.01); *F16K 31/18* (2013.01)

(56) References Cited

U.S. PATENT DOCUMENTS

| | | | |
|---|---|---|---|
| 4,555,253 | A | 11/1985 | Hull et al. |
| 4,655,282 | A | 4/1987 | Roffelsen |
| 6,251,167 | B1 * | 6/2001 | Berson ............... B01D 19/0047 210/188 |
| 6,478,962 | B1 | 11/2002 | Brockhoff et al. |
| 2006/0107837 | A1 | 5/2006 | Showalter et al. |
| 2008/0289502 | A1 | 11/2008 | Betting et al. |
| 2010/0020052 | A1 | 8/2010 | Sarshar et al. |
| 2016/0166751 | A1 * | 6/2016 | Meyer ................ B01D 19/0047 96/157 |

FOREIGN PATENT DOCUMENTS

| | | | |
|---|---|---|---|
| EP | 1262720 | A2 | 12/2002 |
| EP | 1820550 | A1 | 8/2007 |
| EP | 1887196 | A2 | 2/2008 |
| EP | 2313174 | A1 | 1/2010 |
| EP | 2266676 | A1 | 12/2010 |
| EP | 2715153 | A1 | 11/2012 |
| FR | 2029405 | | 10/1970 |
| GB | 884221 | | 12/1961 |
| GB | 1579516 | | 11/1980 |
| GB | 2078133 | A | 1/1982 |
| GB | 2160440 | A | 12/1985 |
| WO | 97/14922 | A1 | 4/1997 |
| WO | WO 97/14922 | * | 4/1997 ............. B01D 19/00 |
| WO | 0100296 | A1 | 1/2001 |
| WO | 02100510 | A1 | 12/2002 |
| WO | 03045525 | A1 | 6/2003 |
| WO | 2012161721 | A1 | 11/2012 |
| WO | 2012165965 | A2 | 12/2012 |

OTHER PUBLICATIONS

Aug. 18, 2017—ISR—App PCT/NL2017/050439.

* cited by examiner

GAS SEPARATOR

CROSS-REFERENCE TO RELATED APPLICATIONS

This application is a U.S. National Stage application under 35 U.S.C. § 371 of International Application PCT/NL2017/050439 (published as WO 2018/004347 A1), filed Jul. 3, 2017, which claims the benefit of priority to Application NL 2017087, filed Jul. 1, 2016. Benefit of the filing date of each of these prior applications is hereby claimed. Each of these prior applications is hereby incorporated by reference in its entirety.

FIELD OF THE INVENTION

The invention relates to a separator device for separating gas from a liquid flow. More in general, the invention relates to heating and/or cooling systems.

BACKGROUND TO THE INVENTION

Heating and/or cooling systems are known per se. Many of these systems include a closed circuit comprising a heating and/or cooling medium, such as a liquid. In these systems, gas may be present within the closed circuit. The gas may be free gas, e.g. bubbles or gas heads within components in the closed circuit, or gas dissolved in the liquid heating and/or cooling medium. It is preferred to remove the gas from the medium.

Heating and/or cooling systems are known which have a degassing device comprising a valve which is, e.g. manually, opened during maintenance for removing gas from the closed circuit. Also, automatic degassing devices are known, such as automatic micro-bubble degassing devices.

SUMMARY OF THE INVENTION

It is an object to provide a separator device with improved efficiency for separating gas from the liquid flow.

Thereto, according to an aspect, is provided a separator device for separating gas from a liquid flow, including a housing having one or more ports for connecting to the liquid flow. The separator device includes a valve arranged for allowing gas to escape from the housing. The separator device includes a float arranged for operating the valve. The separator device includes a nozzle in communication with the liquid flow for spraying a part of the liquid of the liquid flow into the housing.

Preferably, in use, the housing is at most partially filled with the liquid. Hence, the housing includes a gas head. The float floats on the surface of the liquid in the housing. When a predetermined amount of gas has accumulated in the housing, the gas head reaches a predetermined volume, i.e. the liquid surface has dropped to a predetermined level, such that the float activates the valve to open and release the accumulated gas to the ambient atmosphere. The nozzle can create a jet and/or mist of the liquid in the housing. Hence degassing of the liquid in the housing is promoted.

The nozzle can spray liquid into a volume of gas inside the housing which promotes degassing of the liquid.

Optionally, the nozzle is positioned higher than the float. Hence, the nozzle is situated at a level higher than the liquid level. The nozzle may be located in an upper part of the housing. Spraying into the gas head provides the advantage that gas that has been removed from the liquid is directly stored in the gas head so that re-solution of the gas into the liquid is minimized.

The nozzle can be arranged to spray in a direction away from the liquid surface in the housing. The sprayed liquid then may have a long free pathway in the housing, allowing for efficient removal of gas from the liquid droplets or jet. Also, the nozzle may be arranged to spray the jet of the liquid towards an inner wall of the housing, wherein the jet, upon impingement on the inner wall, will break up in small droplets for efficient degassing.

Optionally, the nozzle is arranged such that the sprayed liquid causes the float to move, e.g. to jiggle. Optionally, the nozzle is positioned and/or directed such that the sprayed liquid causes the float to move, e.g. to jiggle Optionally, the nozzle is arranged for spraying at least part of the liquid against the float. It is also possible that the nozzle is arranged for spraying at least part of the liquid against a member connecting the float and the valve. Hence, the float may be brought or kept in motion by the sprayed liquid. The float may then e.g. be in a periodic or random oscillation. Having the float in motion reduces the risk of the float, e.g. temporarily, sticking to part of the housing, such as an inner wall. Hence, delays in opening of the valve may be prevented or at least minimized. Reducing delays in opening the valve also reduces the effect of re-solution of gas into the liquid.

Optionally, the housing includes a first chamber and a second chamber. The second chamber can be placed above the first chamber. The nozzle 24 can be positioned in the first chamber. The float can be positioned in the second chamber. The first chamber can include a rise pipe. The rise pipe can have a first open end. The nozzle can be positioned higher than the first open end. Hence, a volume of gas can build up in the first chamber. The nozzle can be positioned higher than the liquid level associated with the volume of gas in the first chamber. When the amount of gas in the first chamber increases, the liquid level in the first chamber will drop. Once the liquid level in the first chamber drops below the first open end of the rise pipe, gas can escape through the rise pipe into the second chamber. The second chamber may include a gas head and a liquid level. The float can be positioned in the second chamber. If the amount of gas in the second chamber increases, the liquid level in the second chamber will drop. The liquid level in the second chamber may drop until the float has been lowered sufficiently to open the valve. At that moment gas can be allowed to escape from the housing and the liquid level in the second chamber will rise again until the float is raised sufficiently to close the valve again.

The separator device housing can include the port, e.g. an inlet, and a second port, e.g. an outlet, and a flow path extending from the port to the second port for allowing liquid to flow through the housing. In that case the separator device can be used in a flow-through mode. It is also possible that the separator device includes only a single port (in addition to the nozzle). In that case the separator device can be used in an end-mode.

Optionally, the separator device includes means for reducing a pressure inside the housing. Reducing the pressure inside the housing increases degassing efficiency. Optionally, the separator device includes a venturi in the liquid flow path extending from the inlet to the outlet for reducing a pressure inside the housing.

The nozzle may be in communication with the liquid flow upstream of the venturi. The nozzle may be in communication with the liquid flow downstream of the venturi. Optionally, the nozzle is in communication with the liquid flow downstream of the inlet of the housing. Hence, the nozzle can be fed with liquid from within the housing and the inlet and outlet can be the only ports that require connection to the liquid flow.

It will be appreciated that use of the venturi provides the advantage that the pressure reduction in the housing can be achieved passively, only using the liquid flow as energy source. The separator device can be used in series with a main flow of the liquid flow. Alternatively the separator device can be used in parallel with a main flow of the liquid flow.

Optionally the venturi is arranged for lowering the pressure of the liquid to at or slightly above the vapor pressure of the liquid.

Optionally, the separator device includes a pump for pumping the liquid along the liquid flow path. Hence, the pump can be used for regulating flow speed through the venturi, and hence for regulating the pressure inside the housing. However, the pump can also be used for reducing the pressure inside the housing without a venturi. For instance a restriction may be positioned at an upstream prat of the liquid flow path.

Optionally, the separator device includes a pressure sensor for measuring a pressure inside the housing and a controller arranged for controlling the pump on the basis of the measured pressure. The controller can be arranged for controlling the pump to maintain a predetermined pressure inside the housing.

Optionally, the controller is arranged for controlling the pressure inside the housing to be below, or equal to, the vapor pressure of the liquid. This can assist in generating gas bubbles.

Optionally the controller is arranged for, at least at times, controlling the pressure inside the housing to be higher than, or equal to, the ambient pressure outside the housing. This can assist in expelling gas from the housing.

Optionally, the controller is arranged for controlling the pressure inside the housing to be alternately below, or equal to, the vapor pressure and above, or equal to, the ambient pressure. Optionally, the controller is arranged for controlling the pressure inside the housing to be alternately below and above, or equal to, the ambient pressure. Hence, the separator device can alternate between improved degassing conditions and improved expelling conditions.

Optionally, the controller is arranged for performing a test run comprising the steps of controlling the pump to run at maximum power; and at maximum pump power, determining the pressure inside the housing. Running the pump at maximum power can cause the pressure to reduce to the vapour pressure (or close to the vapour pressure). After the test run, the controller can be arranged for controlling the pump to maintain a pressure at or slightly above the determined minimum pressure determined during the test run. Slightly above the minimum pressure can e.g. be 0 to 0.2 bar above the determined minimum pressure.

Optionally, the separator device includes a temperature sensor for measuring a temperature inside the housing and a controller arranged for controlling the pump on the basis of the measured temperature. The controller can be arranged for controlling the pump to maintain a predetermined temperature inside the housing.

Optionally, the separator device includes a liquid level sensor for determining a liquid level inside the housing and a controller arranged for controlling the pump on the basis of the measured liquid level. The controller can be arranged for controlling the pump to maintain a substantially constant liquid level inside the housing.

Optionally, the separator device includes a gas bubble detector for detecting gas bubbles in the housing and a controller arranged for controlling the pump on the basis of the bubble detection. The controller can be arranged for reducing the energy supplied to the pump and/or for stopping the pump when the amount of gas bubbles detected is below a predetermined threshold.

Optionally, the separator device includes a flow switch arranged for measuring gas flow at the valve and a controller arranged for controlling the pump on the basis of the measured gas flow. The controller can be arranged for switching off the pump when the measured gas flow is below a predetermined threshold.

Optionally, the separator device includes a second pressure sensor arranged for determining the liquid pressure in a closed circuit connected to the housing and a controller arranged for controlling the pump on the basis of the pressure measured by the second pressure sensor. This measure pressure inside the closed circuit and outside the housing, can increase due to growing of the gas head inside the housing. Optionally, the controller is arranged for causing expulsion of gas from the separator when the pressure measured by the second pressure sensor is above a predetermined threshold. When the pressure in the closed circuit exceeds the threshold level, forced expulsion of gas from the housing may relieve the pressure in the closed circuit. Optionally, the controller is arranged for reducing the energy supplied to the pump and/or for stopping the pump when the pressure measured by the second pressure sensor is above a predetermined threshold.

Optionally, the controller arranged for controlling the pump on the basis of the pressure measured by the second pressure sensor for avoiding or reducing interference with pressure control of other apparatuses included in the closed liquid circuit, such as a boiler.

It will be appreciated that the above mentioned controllers can be separate individual controllers, or can be partial controllers of a combined controller.

Optionally the valve includes a check valve. Optionally, the valve includes a check valve in series with the float operated valve.

According to an aspect is provided a separator device for separating gas from a liquid flow. The separator device includes a restriction, such as a venturi, arranged for reducing a pressure of the liquid to below the vapor pressure of the liquid, so as to generate gas bubbles. The separator device includes a housing for accumulating the gas bubbles. The separator device includes a valve for allowing gas to escape from the housing. A flow path can extend through the restriction and through the housing. It will be appreciated that the options described with respect to the first described separator device also apply to this separator device.

According to an aspect is provided a heating and/or cooling system including a separator device as described above. This provides the advantage that gas can efficiently be removed from the liquid of the heating and/or cooling system. The heating and/or cooling system can include a closed liquid circuit. In the closed liquid circuit a heating and/or cooling liquid circulates. The system can include a heater device, a pump and a radiator. In use, the heating liquid can be heated in the heater device and pumped to the radiator for heating a surroundings of the radiator. The system can include a cooling device a pump and a heat exchanger. In use, the cooling liquid can be cooled in the cooling device and pumped to the heat exchanger for cooling a surroundings of the heat exchanger.

According to an aspect the heating and/or cooling system includes a liquid flow circuit and separator device for separating gas from a liquid flow. The separator device includes a housing having a port. The port is in liquid communication with the liquid flow circuit at a first position. The separator device includes a valve arranged for allowing gas to escape from the housing, and a float arranged for operating the valve. The separator device includes a nozzle for spraying liquid into the housing. The nozzle is in liquid communication with the liquid flow circuit at a second position. The first and second positions are selected such that in use the pressure of the liquid in the liquid flow circuit at the second position is higher than at the first position. Hence, a natural pressure difference in the liquid flow circuit can be exploited when degassing. The liquid at the higher pressure fed to the nozzle can be sprayed into a gas head at the lower pressure of the liquid fed to the port of the housing. Hence, degassing efficiency can be increased. The first position can e.g. be (just) upstream of a pump, such as a pump of a heater device. The second position can e.g. be (just) downstream of said pump. The first position can e.g. be at or near an exit manifold of a floor heating unit. The second position can e.g. be at or near an entrance manifold of the floor heating unit.

Preferably, the solubility of gas in the liquid is lowest inside the housing. Thereto, the pressure inside the housing may be the lowest pressure in the closed liquid circuit. The pressure inside the housing may be subatmospheric. It is also possible that the degassing pressure inside the housing is close to atmospheric pressure. The degassing pressure can be 0.1 to 0.5 bar higher than atmospheric pressure. Nevertheless, the degassing pressure may, in certain cases be more than 0.5 bar higher than atmospheric pressure. It will be appreciated that the temperature of the liquid in the housing when being degassed also influences the solubility of the gas in the liquid.

It is also possible that the degassing pressure is a predetermined amount lower than a working pressure of the system, i.e. a predetermined pressure drop is experienced over the nozzle. Also in this case, the degassing pressure can be higher than atmospheric pressure and lower than the working pressure.

According to an aspect is provided a method for separating gas from a liquid flow. The method includes routing a liquid flow along a liquid flow path extending through a housing of a separator device including a valve arranged for allowing gas to escape from the housing and a float arranged for operating the valve. The method includes spraying part of the liquid of the liquid flow into the housing for obtaining a jet and/or mist of the liquid in the housing. The method includes removing gas from the housing via the valve.

According to an aspect is provided a method for separating gas from a liquid flow. The method includes routing a liquid flow along a liquid flow path extending through a housing, the liquid flow path including a venturi. The method includes reducing a pressure of the liquid using the venturi to below the vapor pressure of the liquid so as to generate gas bubbles. The method includes collecting the gas bubbles in the housing. The method includes removing gas from the housing via a valve.

According to an aspect is provided a method for separating gas from a liquid flow. The method includes routing a liquid through a closed liquid circuit including a separator device including a valve arranged for allowing gas to escape from the separator device and pumping the liquid along the closed circuit using a pump. The method includes measuring a pressure in the closed circuit outside the separator device, and controlling gas separation on the basis of the measured pressure using a controller.

It will be appreciated that any of the aspects, features and options described in view of the separator devices apply equally to the system and the methods. It will also be clear that any one or more of the above aspects, features and options can be combined.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

Figure 1A:
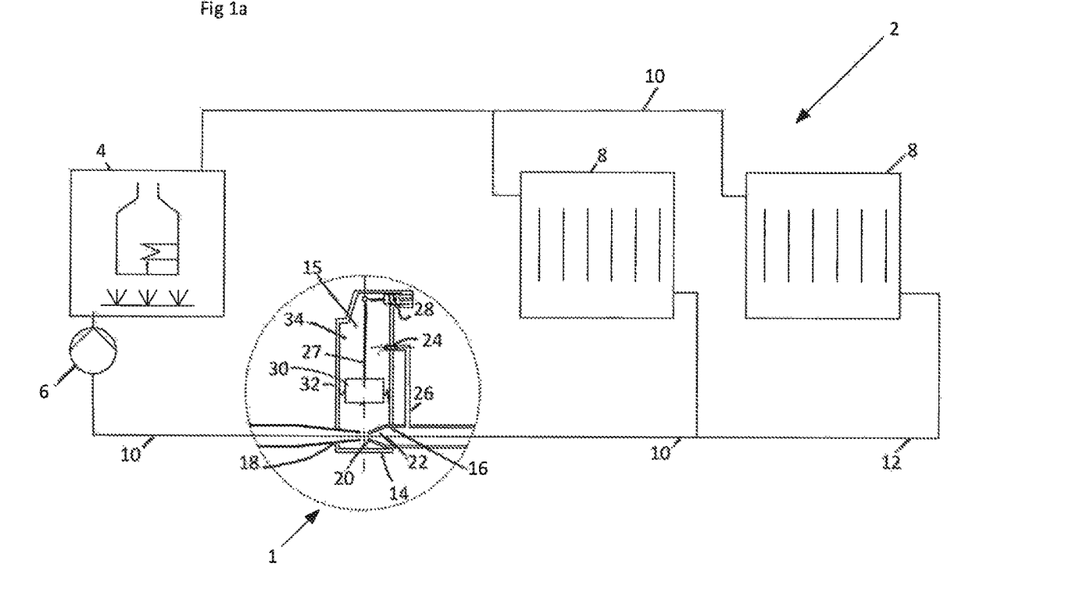
FIG. 1A shows a schematic view of a separator.

FIG. 1A shows a schematic cross sectional view of a separator device 1 for separating gas from a liquid flow. In FIG. 1A the separator device 1 is included in a heating system 2. The heating system 2 includes a heater 4, a pump 6, and radiators 8. Piping 10 connects the heater 4, pump 6, radiators 8 in a closed liquid circuit 12. The device 1 includes a housing 14 having an inlet 16 and an outlet 18. The housing has an inner chamber 15. The separator device 1 includes a venturi 20 in a liquid flow path 22 extending from the inlet 16 to the outlet 18. The separator device 1 includes a nozzle 24. In this example the nozzle is in communication with the piping 10 upstream of the inlet 16 via a tube 26. It will be appreciated that the nozzle 24 may also be in communication with piping 10 downstream of the outlet 18. It is also possible that the nozzle is in communication with the liquid flow path 22, e.g. via a tube internal of the housing 14.

The separator device 1 includes a valve 28 for allowing gas to escape from the housing 14. Here, the valve 28 is an automatic valve for removing gas separated from the liquid out of the housing 14. In this example the separator device 1 includes a float 30 connected to the valve 28. Here the float 30 is connected to the valve 28 via a rod 27.

The separator device 1 as described up to here can be operated as follows.

In the example of FIG. 1A the separator device 1 is included in the closed liquid circuit 12. Heating liquid, e.g. water, is pumped through the closed circuit 12. The liquid passing through the flow path 22 of the separator device 1 will pass through the venturi 20. This will cause a pressure drop inside the housing 14. In this example the venturi has a first conical wall section at the upstream parts and a second conical wall section at a downstream part. An opening angle of the conical wall section at the downstream part here is approximately ten degrees. Optionally the opening angle is approximately twenty degrees or less.

In this example the nozzle 24 is situated at a level higher than a liquid level 32 inside the housing. Here the nozzle 24 is located higher than the float 30. The nozzle 24 sprays liquid, fed through the tubing 26, into a gas head 34 inside the housing 14, e.g. as a jet or mist. Due to the pressure reducing effect of the venturi 20 the pressure inside the gas head 34 is lower than the liquid pressure at the inlet 18. The reduced pressure promotes degassing of the liquid. Also, the forming of a jet or mist by the nozzle 24 increases the surface area of the liquid being degassed which promotes degassing of the liquid. The jet or mist being sprayed into the gas head 34 provides the advantage that the degassed gas has only limited contact area with the liquid and does not pass through the liquid. Hence re-solution of the gas before being expelled from the inner chamber 15 is limited.

The degassing of the liquid will cause the gas head 34 to expand, causing the liquid level 32 inside the housing to drop. The liquid level 32 will drop until the float 30 has been lowered sufficiently to open the valve 28.

Gas can be expelled from the housing of the separator device 1 when the pressure of the gas in the gas head 34 is higher than the ambient gas pressure outside the separator device 1. It is possible that the pressure inside the gas head 34 is maintained at a level between ambient pressure and the pressure of the liquid in the closed liquid circuit 12.

It is also possible that the pressure inside the gas head 34 is maintained at a level below atmospheric pressure when degassing. Expelling of the gas from the separator device 1 can then be achieved by temporarily increasing the gas pressure of the gas head 34 to a pressure higher than or equal to the ambient pressure. Thereto for instance the pump 6 may be stopped so as to interrupt the pressure reducing action of the venturi 20.

At the moment gas is allowed to escape from the housing the liquid level 32 will rise again until the float is raised sufficiently to close the valve 28 again. It will appreciated that thus a gas head 34 can be maintained for spraying the liquid therein.

In this example, the nozzle 24 directs at least some of the sprayed liquid against the float 28 and/or the rod 27. Hence the float 30 is brought and kept in motion. The float may jiggle under the influence of the sprayed liquid. By keeping the float in motion, a tendency of the float to adhere to an inner wall of the housing 14 is reduced. Hence, the float 30 can more easily lower or rise in response to an increase or decrease of the volume of gas in the gas head 34. Hence, the response of the valve 28 to changes in the gas volume in the gas head 34 can be faster than for a still float.

In the example of FIG. 1A the separator device 1 is included in the main flow path of the closed circuit 12. This provides the advantage that the venturi 20 is operated passively, i.e. using the motive power of the pump 6 that is already included in the heating system 2. An additional pump for providing liquid flow through the venturi 20 is not necessary. Of course t is possible to provide an additional pump 38 associated with the separator device 1 upstream of the inlet 16 or downstream of the outlet 18.

Figure 1B:
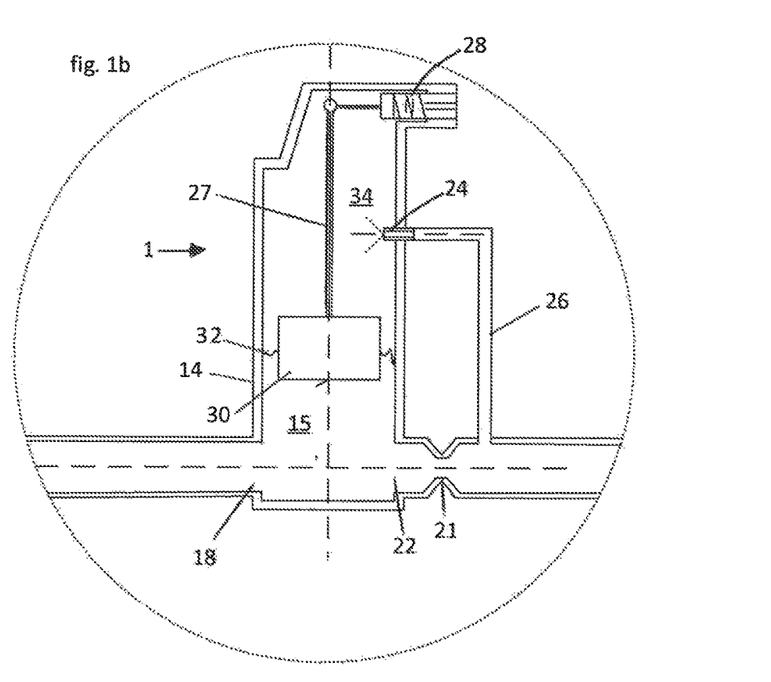
FIG. 1B shows a schematic cross sectional view of a separator device.

FIG. 1B shows an alternative separator device 1. The example of FIG. 1B is highly similar to the example of FIG. 1A. In the example of FIG. 1B, however, the separator device 1 does not include a venturi. Instead, in the example of FIG. 1B the separator device includes a restriction 21 upstream of the inner chamber 15 of the housing 14. When liquid flows through the flow path 22 of the separator device 1 it will pass through the restriction 21. This will cause a pressure drop inside the inner chamber 15. Alternatively, the venturi may be omitted, so that no venturi or restriction may be present.

Figure 2A:
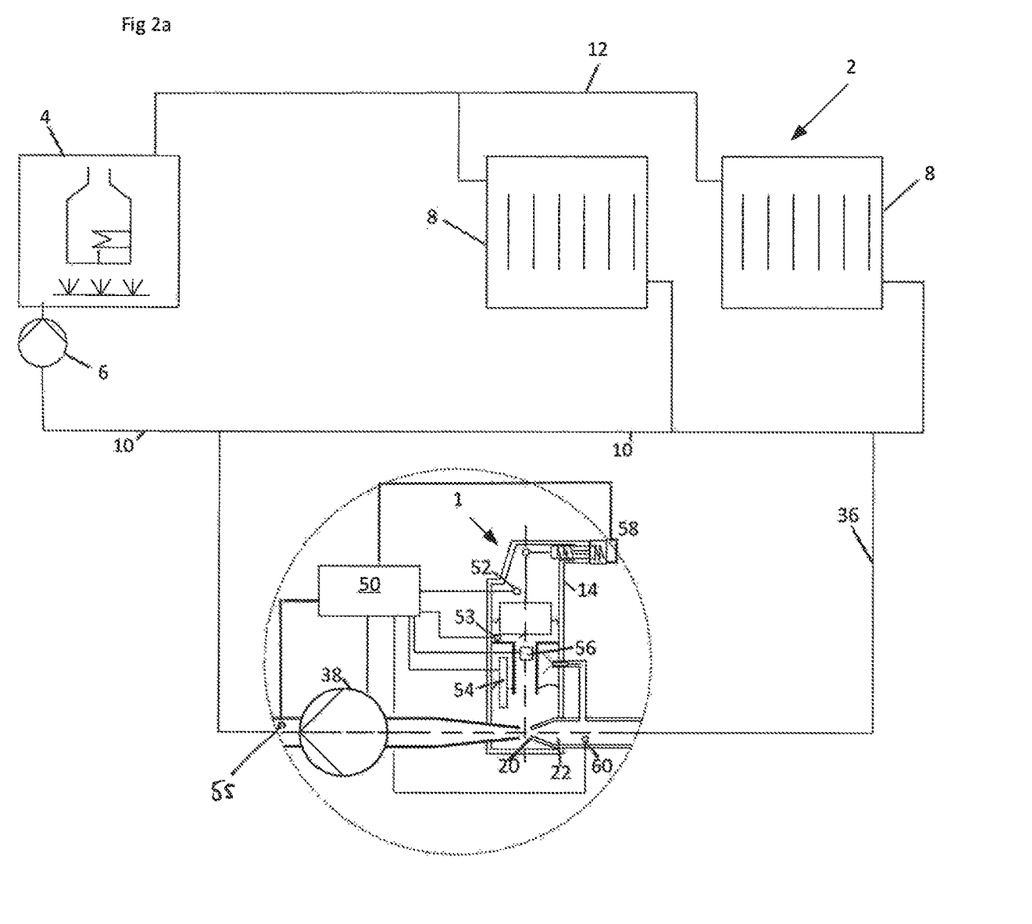
FIG. 2A show schematic view of a separator.
Figure 2B:
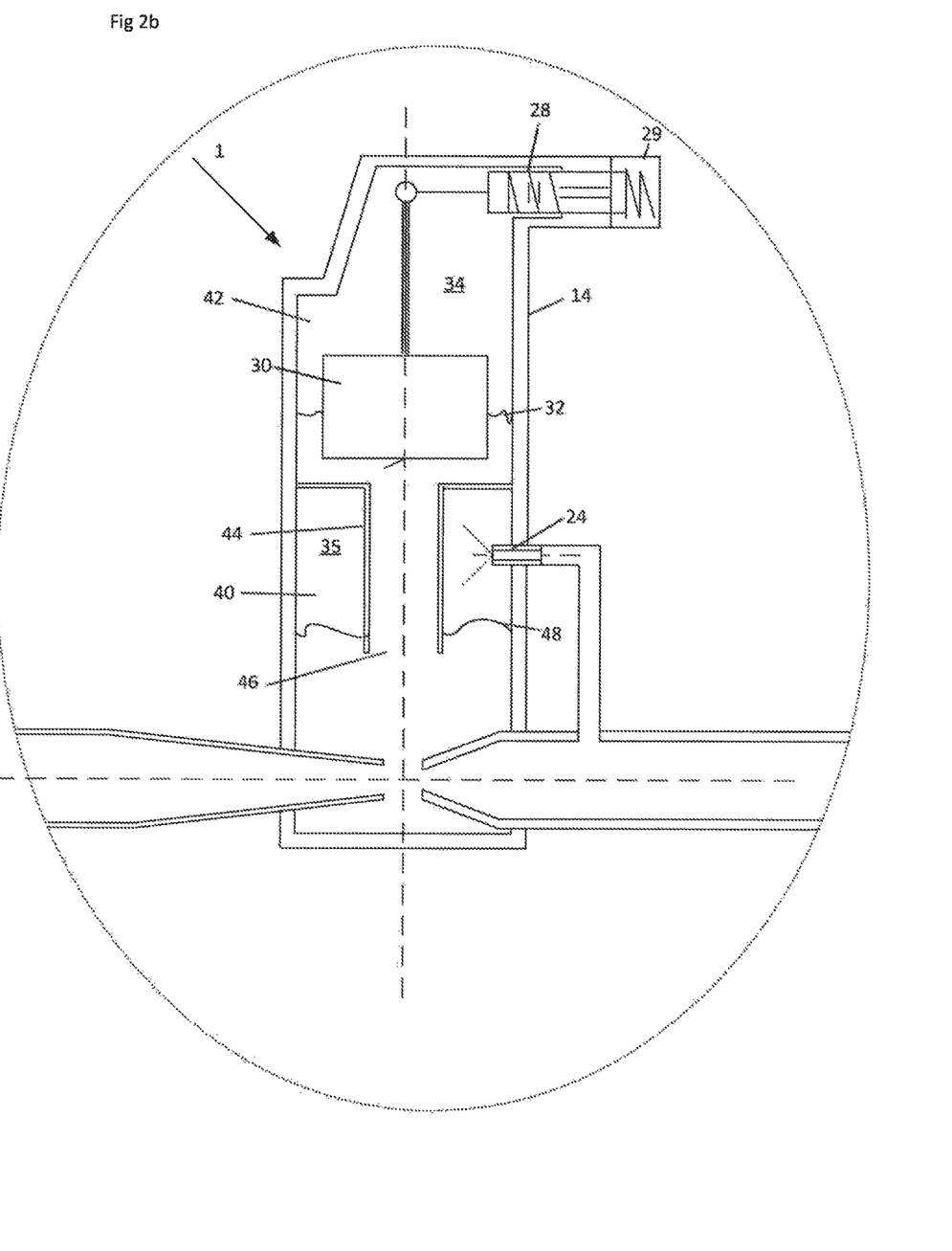
FIG. 2B show schematic cross sectional views of a separator device.

FIGS. 2A and 2B show schematic cross sectional views of a separator device 1 for separating gas from a liquid flow. In FIG. 2A the separator device 1 is included in a heating system 2. The heating system 2 includes a heater 4, a pump 6, and radiators 8. Piping 10 connects the heater 4, pump 6, radiators 8 in a closed liquid circuit 12.

In the example of FIGS. 2A and 2B the housing 14 includes a first chamber 40 and a second chamber 42. The first chamber 40 includes a rise pipe 44. The rise pipe has a first open end 46. The nozzle 24 is positioned higher than the first open end 46. Hence, a volume 35 of gas can build up in the first chamber 40. Here the nozzle 24 is positioned higher than the liquid level 48 associated with the volume 35 of gas in the first chamber 40. If the amount of gas in the first chamber 40 increases, the liquid level 48 will drop. Once the liquid level drops below the first open end 46 of the rise pipe, gas will escape through the rise pipe into the second chamber. The second chamber 42 may include a gas head 34 and a liquid level 32 as well. The float 30 is positioned in the second chamber 42. If the amount of gas in the second chamber 42 increases, the liquid level 32 will drop. The liquid level 32 will drop until the float 30 has been lowered sufficiently to open the valve 28. At that moment gas is allowed to escape from the housing and the liquid level 32 will rise again until the float is raised sufficiently to close the valve 28 again.

It will be appreciated that in this example gas is freed from the liquid in the first chamber 40. The freed gas is then transported to the second chamber 42. From the second chamber 42 the gas can be expelled to the ambient atmosphere.

In this example the valve 28 includes a check valve 29. The check valve 29 prevents gas, e.g. air from being sucked into the housing 14 of the separator device 1 when the pressure in the housing 14 is below ambient pressure outside the housing 14. The valve 28 may include a check valve 29 in series with the float operated valve. Hence, even when the float opens the valve, the check valve 29 prevents ingress of gas, such as air, when the pressure inside the separator device is lower than ambient pressure outside the separator device.

In the example of FIG. 2A the separator device 1 is included in a parallel branch 36 of the closed circuit 12. In this example, the separator device 1 is provided with a pump 38. The pump 38 may provide the flow of liquid through the flow path 22. Here the pump 38 is placed downstream of the venturi 20. Hence, reduced pressure is obtained at the exit of the venturi 20. The pressure inside the housing 14 can then be even further reduced by the action of the venturi. Hence, efficiently a pressure reduction inside the housing can be obtained.

The pump 38 can be used for regulating flow speed through the venturi 20, and hence for regulating the pressure inside the housing 14. The pump can e.g. be controlled manually. The separator device 1 can include a controller 50. The controller may be arranged for manually setting a pump speed of the pump 38. The controller may be arranged for switching the pump 38 on or off. The controller 50 may be arranged for automatically switching the pump on and off in a predetermined, e.g. adjustable and/or programmable, sequence.

Here the separator device 1 includes a pressure sensor 52. The pressure sensor 52 is arranged for measuring a pressure inside the housing 14. The pressure sensor is communicatively connected to the controller 50. In this example the controller 50 is arranged for controlling the pump 38 on the basis of the measured pressure. The controller 50 here is arranged for controlling the pump 38 to maintain a predetermined pressure inside the housing 14.

Alternatively, or additionally, the separator device 1 includes a temperature sensor 53 for determining a liquid temperature inside the housing 14. The temperature sensor 53 is communicatively connected to the controller 50. The controller 50 can alternatively, or additionally, be arranged for controlling the pump 38 on the basis of the measured temperature. The controller 50 can be arranged for controlling the pump 38 to maintain a substantially constant temperature inside the housing 14.

Alternatively, or additionally, the separator device 1 includes a liquid level sensor 54 for determining a liquid level inside the housing 14. The liquid level sensor 54 is communicatively connected to the controller 50. The controller 50 can alternatively, or additionally, be arranged for controlling the pump 38 on the basis of the measured liquid level. The controller 50 can be arranged for controlling the pump 38 to maintain a substantially constant liquid level inside the housing 14.

Alternatively, or additionally, the separator device 1 includes a gas bubble detector 56 for detecting gas bubbles in the housing 14. The gas bubble detector 56 is communicatively connected to the controller 50. The controller 50 can alternatively, or additionally, be arranged for controlling the pump 38 on the basis of the bubble detection. The controller 50 can be arranged for reducing the energy supplied to the pump and/or for stopping the pump when the amount of gas bubbles detected is below a predetermined threshold.

Alternatively, or additionally, the separator device 1 includes a flow switch 58 arranged for measuring gas flow at the valve 28. The flow switch is communicatively connected to the controller 50. The controller 50 can alternatively, or additionally, be arranged for controlling the pump 38 on the basis of the measured gas flow. The controller 50 can be arranged for switching off the pump 38 when the measured gas flow is below a predetermined threshold.

The controller 50 can be arranged for controlling the pump 38 to adjust the pressure inside the gas head 34 to be at or slightly above the vapour pressure of the liquid. At such pressure degassing of the liquid is very efficient. Thereto the controller can use the pressure sensor 52 and/or the temperature sensor 53.

In an example, a test run can be performed in which the pump 38 is controlled to run at maximum power. As long as the pump has sufficient capacity, running the pump at maximum power will cause the pressure to reduce to the vapour pressure (or close to the vapour pressure). At maximum pump power, the pressure inside the gas head 34 can be measured. Next, the controller 50 can be set to control the pump 38 to maintain a pressure slightly above the minimum pressure measured during the test run. Slightly above can e.g. be 0 to 0.2 bar above the measured minimum pressure. Alternatively, or additionally, during the test run at maximum pump power the temperature inside the housing can be measured. As long as the pump has sufficient capacity, running the pump at maximum power will cause the pressure to reduce to the vapour pressure (or close to the vapour pressure). The measured temperature is then representative of the vapour pressure (Clausius-Clapeyron relation). Hence, the controller 50 can be set to control the pump 38 to maintain a temperature slightly above the minimum temperature measured during the test run.

It will be appreciated that instead of the venturi a restriction may be used. Alternatively, the venturi may be omitted.

It will be appreciated that the pump 38 may be controlled such that the pressure inside the gas head 34 is maintained at a level below atmospheric pressure when degassing. Expelling of the gas from the separator device 1 can then be achieved by stopping the pump 38, or reducing power supplied to the pump, for temporarily increasing the gas pressure of the gas head 34 to a pressure higher than or equal to the ambient pressure.

When the gas head 34 expands, liquid can be displaced from inside the housing 14 to into the remainder of the closed liquid circuit 12. This can increase the liquid pressure in the closed liquid circuit 12, especially in smaller closed circuits. The system 1 may be provided with a second pressure sensor 55 arranged for determining the liquid pressure in the closed circuit 12. In this example, the second pressure sensor 55 is located downstream of the pump 38. The second pressure sensor 55 can be alternatively be located at another location in the closed circuit 12 not being within the separator device 1. The controller 50 can be arranged for monitoring the circuit pressure determined by the second pressure sensor 55. If the circuit pressure exceeds a predetermined threshold value, the controller 50 can reducing the energy supplied to the pump 38 and/or stop the pump 38. This can aid in reducing the circuit pressure or in preventing the circuit pressure from rising further. For example, stopping the pump 38 may result in a backflow of liquid into the housing 14, which will reduce the circuit pressure. Also, reducing energy supplied to the pump, or stopping the pump, can cause an increase of pressure inside the housing, causing expelling of gas from the gas head, which in turn may lower the circuit pressure.

The alternating degassing and expelling may cause alternating rising and lowering of the liquid pressure inside the closed circuit 12. The controller 50 can be arranged for damping oscillatory behaviour of the circuit pressure.

The rate at which the liquid pressure in the closed circuit 12 rises relative to growth of the gas head 34 is representative of the expansion condition of the closed circuit 12. The controller 50 can be arranged for generating an alarm when the expansion condition changes. This can e.g. be indicative of malfunctions in an expansion system included in the closed circuit 12.

Figure 3:
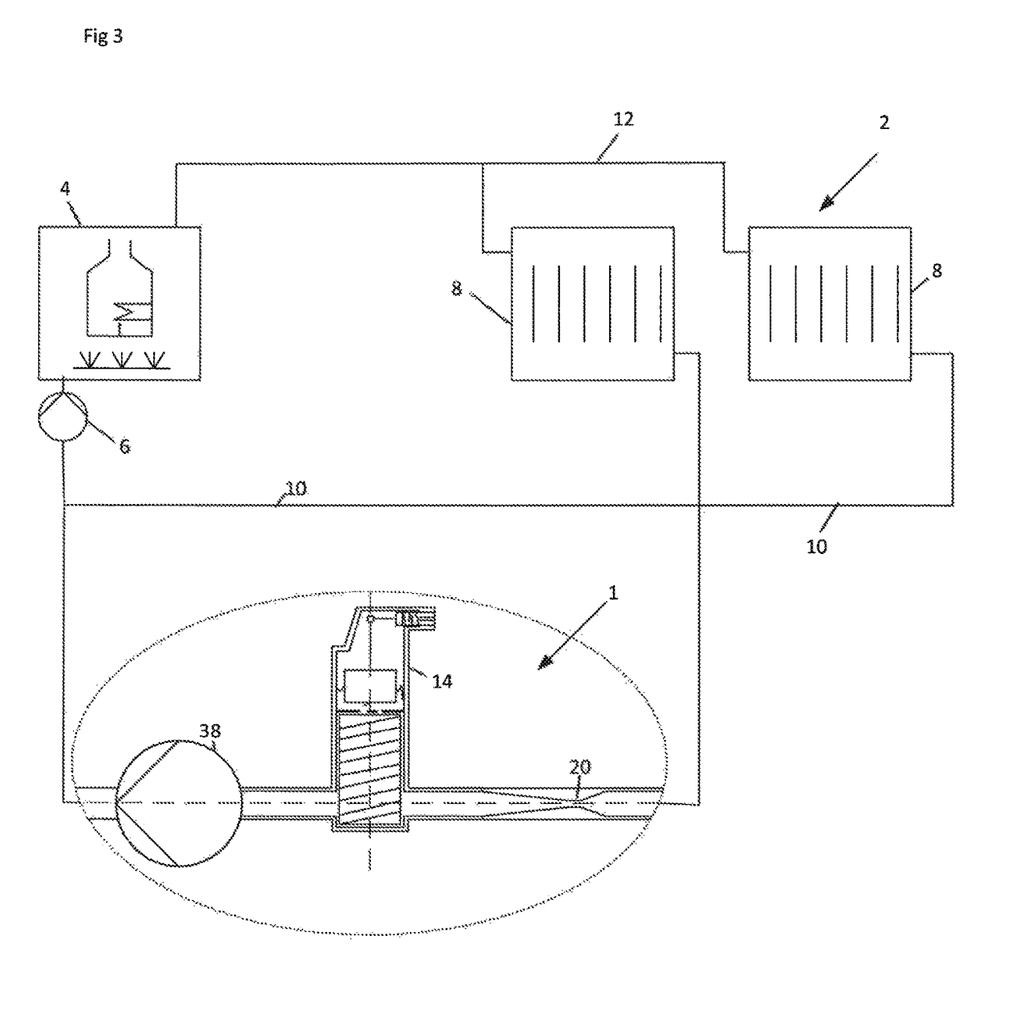
FIG. 3 shows a schematic view of a separator.

FIG. 3 shows an a schematic cross sectional view of a separator device 1 for separating gas from a liquid flow. In FIG. 3 the separator device 1 is included in a heating system 2. In this example the venturi 20 is placed upstream of the housing 14. The pump 38 is placed downstream of the housing 14. In this example the venturi locally reduces the pressure of the liquid to below the vapor pressure of the liquid. Gas bubbles are generated in the low pressure liquid at the venturi 20. It has been found that the gas bubbles may survive without disolving into the liquid for a little while. The distance between the venturi 20 and the housing 14 is chosen sufficiently short for the bubbles to be transported to the housing 14. In the housing 14 the bubbles can be accumulated and expelled as described with respect to FIGS. 1, 2A and 2B. Although not shown in FIG. 3, the nozzle 24 may be used similarly as shown in FIGS. 1, 2A and 2B. It will be appreciated that instead of the venturi a restriction may be used for locally reducing the pressure of the liquid.

According to an aspect is provided a heating and/or cooling system including a separator device as described above. This provides the advantage that gas can efficiently be removed from the liquid of the heating and/or cooling system. The heating and/or cooling system can include a closed liquid circuit. In the closed liquid circuit a heating and/or cooling liquid circulates. The system can include a heater device, a pump and one or more radiators. In use, the heating liquid can be heated in the heater device and pumped to the radiator for heating a surroundings of the radiator. The system can include a cooling device a pump and one or more heat exchangers. In use, the cooling liquid can be cooled in the cooling device and pumped to the heat exchanger for cooling a surroundings of the heat exchanger.

The separator device 1 can be arranged in the heating and/or cooling system such that the inlet 16 of the housing 14 is in liquid communication with the liquid flow circuit at a first position. The separator device 1 can be arranged in the heating and/or cooling system such that the nozzle 24 is in liquid communication with the liquid flow circuit at a second position. The first and second positions can be selected such that in use the pressure of the liquid in the liquid flow circuit at the second position is higher than at the first position.

Figure 4:
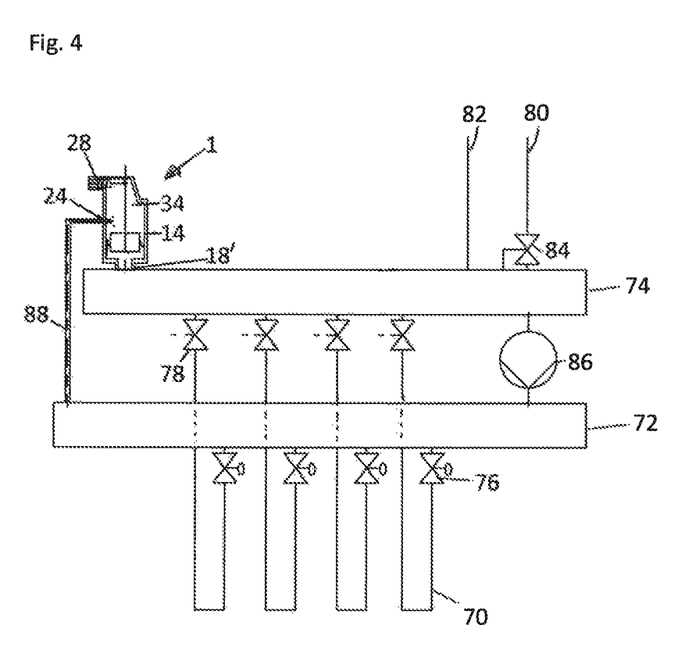
FIG. 4 shows a schematic view of a separator.

FIG. 4 shows an example of a floor heating system 2. The floor heating system includes a plurality of floor heating tubes 70. The heating tubes are connected to an entrance manifold 72 and an exit manifold 74. Here the heating tubes 70 are connected to the entrance manifold 72 via control valves 76. The control valves 76 can control which one(s) of the heating tubes are opened or closed. In this example, the heating tubes 70 are connected to the exit manifold via motor valves 78. The manifolds 72, 74 connect to a closed liquid circuit. Here a feed line 80, coming from a heating device, and a return line 82, feeding water back to the heating device, are shown. In this example, a thermostat valve 84 is included in the feed line 80. Further, a pump 86 connects the entrance manifold 72 and the exit manifold 74 for establishing a flow through the heating tubes 70.

In this example, a port 18' of the housing 14 of the separator device 1 is connected to the exit manifold 74. Hence the exit manifold 74 can be said to be the first position. It is noted that in this example the separator device 1 does not include a flow path extending from an inlet to an outlet. Hence, liquid does not flow from the exit manifold 74 through the separator device 1.

In this example the nozzle 24 is connected to the entrance manifold 72 via a tube 88. Alternatively, the nozzle 24 is connected to the feed line 80, e.g. via a tube. Here, from the entrance manifold 72 heating liquid is fed to the nozzle 24. Hence, the entrance manifold 72 can be said to be the second position. It will be appreciated that the pressure of the heating liquid in the entrance manifold 72 or feed line 80 will be higher than the pressure of the heating liquid in the exit manifold 74. Hence, the liquid is sprayed into the air head 34 by the nozzle at a higher pressure than the pressure of the air head which is determined by the pressure of the exit manifold 74. As a result efficient degassing can be achieved. Also due to the pressure difference between the inlet 16 and the nozzle 24 liquid will flow from the entrance manifold 72, via the nozzle 24, into the housing 14 and out to the exit manifold via the port 18'.

Preferably, the solubility of gas in the liquid is lowest inside the housing 14. Thereto, the pressure inside the housing 14 may be maintained at the lowest pressure in the closed liquid circuit 12 and/or at the highest temperature in the closed liquid circuit 12. The pressure inside the housing may be subatmospheric. It is also possible that the degassing pressure inside the housing is close to atmospheric pressure. The degassing pressure can be 0.1 to 0.5 bar higher than atmospheric pressure. Nevertheless, the degassing pressure may, in certain cases be more than 0.5 bar higher than atmospheric pressure. It will be appreciated that the temperature of the liquid in the housing when being degassed also influences the solubility of the gas in the liquid. It will be appreciated that the controller 50 may be set to maintain the pressure inside the housing at a predetermined setpoint.

The controller may also be arranged to maintain the pressure inside the housing within a predetermined range. The controller may e.g. activate the pump to bring the pressure to a lower limit of such range, deactivate the pump when the lower limit is reached, monitor the pressure inside the housing until the pressure reaches an upper limit of the range and reactivate the pump to bring the pressure in the housing to the lower limit again. This process may be performed cyclically.

It is also possible that the degassing pressure is a predetermined amount lower than a working pressure of the system, i.e. a predetermined pressure drop is experienced over the nozzle. Thereto a second pressure sensor 60 may be provided, communicatively connected to the controller 50. Also in this case, the degassing pressure can be higher than atmospheric pressure and lower than the working pressure.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

In the examples the separator device is part of a heating system. It will be appreciated that the separator device can also be part of a cooling system. The cooling system can include a cooling device a pump and a heat exchanger.

In the example of FIG. 2A the separator device includes a pump and a controller. It will be appreciated that the separator device of FIG. 1 may also be provided with a pump and a controller. Similarly, the separator device of FIG. 1 may also include a pressure sensor, a liquid level sensor, a gas bubble sensor, a flow switch, and/or a second pressure sensor.

The separator device of FIGS. 1 and 4 is placed in series in the main liquid flow of the closed circuit 12. It will be appreciated that the separator device of FIG. 1 may also be placed in a parallel branch of the closed circuit. The separator device of FIGS. 2A and 3 is placed in in a parallel branch of the closed circuit 12. It will be appreciated that the separator device of FIG. 2A may also be placed in series in the main flow of the closed circuit.

In the examples the nozzle sprays a jet or mist of liquid into a gas head. It is also possible that the nozzle shoots a jet of liquid into a body of liquid contained in the housing. The housing may include bodies to promote bubble growth. Such bodies may include spheres, wires or the like. Such body may e.g. include a spiraling wire. Such body may e.g. include a so-called spirotube. The spirotube comprises a core tube, surrounded by a coil of wire. The construction of such spirotube is generally as described in patent documents GB 1,579,516, U.S. Pat. Nos. 4,655,282, 3,854,906, 4,027,691 or 4,381,928 and reference can be had to these documents for further details.

In the examples the venturi is positioned inside the housing 14. It will be appreciated that the venturi can also be positioned outside the housing. Then the reduced pressure section of the venturi can be in fluid communication with the housing e.g. via a pipe or tubing.

It will be appreciated that the check valve can also be used in the examples of FIGS. 1, 3 and 4.

It will be appreciated that in the example of FIG. 3 the nozzle is not strictly necessary when the venturi is arranged to generate gas bubbles, e.g. by locally reducing the pressure of the liquid to below the vapor pressure of the liquid. It will be clear that the same applies to the examples of FIGS. 1, 2A and 2B.

In the example of FIG. 4 the separator device does not include a flow path extending from the inlet to an outlet. Hence, there is no liquid flow path, beside a flow of liquid from the nozzle to the inlet. It will be appreciated that, alternatively, the separator device may include the inlet and the outlet. The inlet can e.g. be connected to the exit manifold. The outlet can e.g. be connected to the return line. Hence, liquid can be made to flow through the housing from the inlet to the outlet.

In the examples the tubing 26 is shown as being located outside the housing. It will be appreciated that the tubing can also be provided within the housing.

However, other modifications, variations, and alternatives are also possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A separator device for separating gas from a liquid flow, including:
   a housing having an inlet and an outlet for connecting to the liquid flow, a flow path extending from the inlet to the outlet for allowing liquid to flow through the housing;
   a valve arranged for allowing gas to escape from the housing;
   a float arranged for operating the valve;
   a nozzle in communication with the liquid flow for spraying a part of the liquid of the liquid flow into the housing; and
   a venturi in the liquid flow path for reducing a pressure inside the housing.

2. The separator device of claim 1, wherein the nozzle is positioned higher than the float.

3. The separator device of claim 1, wherein the nozzle is arranged for spraying at least part of the liquid such that the sprayed liquid causes the float to move.

4. The separator device of claim 1, further including a pump for pumping the liquid along the liquid flow path.

5. The separator device of claim 4, including a pressure sensor for measuring a pressure inside the housing and a controller arranged for controlling the pump on the basis of the measured pressure.

6. The separator device of claim 5, wherein the controller is arranged for controlling the pump to maintain a predetermined pressure inside the housing.

7. The separator device of claim 5, wherein the controller is arranged for controlling the pump to be alternately below and above, or equal to, the ambient pressure.

8. The separator device of claim 4, including a liquid level sensor for determining a liquid level inside the housing and a controller arranged for controlling the pump on the basis of the measured liquid level.

9. The separator device of claim 8, wherein the controller is arranged for controlling the pump to maintain a substantially constant liquid level inside the housing.

10. A heating and/or cooling system including the separator device of claim 1.

11. A method for separating gas from a liquid flow, including:
   routing a liquid flow through a flow path extending from an inlet to an outlet of a housing of a separator device including a valve arranged for allowing gas to escape from the housing and a float arranged for operating the valve;
   reducing pressure inside the housing by a venturi in the liquid flow path;
   spraying part of the liquid of the liquid flow into the housing for obtaining a jet and/or mist of the liquid in the housing; and
   removing gas from the housing via the valve.

12. The method of claim 11, wherein the spraying includes spraying the liquid at a position higher than the float.

13. The method according to claim 11, wherein the spraying includes spraying at least part of the liquid such that the sprayed liquid causes the float to move.

14. The method of claim 11, further including pumping the liquid along the liquid flow path using a pump.

15. The method of claim 14, including measuring a pressure inside the housing and controlling the pump on the basis of the measured pressure using a controller.

16. The method of claim 14, including measuring a pressure inside a closed circuit connected to the housing and controlling the pump on the basis of the measured pressure using a controller.

17. The method of claim 15, including controlling the pump to maintain a predetermined pressure inside the housing.

18. The method of claim 15, including performing a test run comprising the steps of:
   controlling the pump to run at maximum power; and
   at maximum pump power, determining the pressure inside the housing;
   wherein the method includes controlling the pump to maintain a pressure at or above the minimum pressure measured during the test run.

19. The separator device of claim 1, wherein the venturi is positioned inside the housing.

20. The separator device of claim 19, wherein the venturi includes an upstream part and a downstream part, and is in communication with an inner chamber of the housing between the upstream and downstream parts.

21. The separator device of claim 20, wherein the venturi includes a first conical wall section at the upstream part and a second conical wall section at the downstream part.

22. The separator device of claim 1, wherein the venturi is arranged for lowering the pressure of the liquid to at or slightly above the vapor pressure of the liquid.

23. The separator device of claim 4, wherein the pump is positioned downstream of the venturi.

* * * * *